United States Patent Office 3,658,953
Patented Apr. 25, 1972

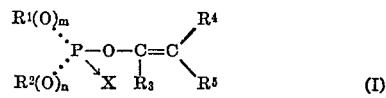

3,658,953
PROCESS FOR THE PREPARATION OF SUBSTITUTED VINYL ESTERS OF ACIDS OF PHOSPHORUS
Dirk E. Poel, Dirk Medema, Robert van Helden, and Nanno Fekkes, Amsterdam, Netherlands, and Elliot Bergman and Jack Wood, Kent, England, assignors to Shell Oil Company, New York, N.Y.
No Drawing. Filed Jan. 21, 1969, Ser. No. 793,924
Claims priority, application Great Britain, Jan. 25, 1968, 3,983/68
Int. Cl. C07d *105/04;* C07f *9/08*
U.S. Cl. 260—970                                 7 Claims

ABSTRACT OF THE DISCLOSURE

Vinyl esters of phosphorus acids having biological activity as pesticides are prepared by reacting dialkyl phosphites or thiophosphites and/or monoalkyl phosphonites, secondary phosphine oxides and their corresponding thio-analogues with an alpha-haloketone in the presence of a base such as gaseous ammonia and di- or trialkyl amines. The amount of base used is at least 0.5 gram equivalents of base per mole of alpha-haloketone.

---

The invention relates to a process for the preparation of substituted vinyl esters of acids of phosphorus, such as vinyl phosphates, phosphorothioates, phosphonates, thiophosphonates, phosphinates, and thiophosphinates, some of which are novel compounds.

Vinyl phosphates have usually been prepared, heretofore, by allowing an α-haloketone, e.g. a dichloromethyl polyhalophenyl ketone, to react with a trialkyl phosphite (Perkow reaction). These reactions proceed with elimination of an equimolar amount of alkyl chloride. When a trialkyl phosphite is used having two or three dissimilar alkoxy groups bound to the phosphorus atom, mixtures of the revelant vinyl phosphates invariably result. Only part of the components thereof consist of compounds having two particular dissimilar alkoxy groups bound to the phosphorus atom. This method is not practicable, therefore, when it is desired to prepare such a compound in pure form and with high yields.

Dialkyl phosphites have also been known to react with certain α-haloketones. The resulting products, however, are not the desired vinyl phosphates, but halogenated hydroxyalkyl phosphonates. Moreover, long reaction times and elevated temperature are as a rule necessary in order to achieve these conversions. This is also the case if certain bases are present in catalytic amounts.

Surprisingly, it has now been found that a dialkyl phosphite or thiophosphite when used in conjunction with larger amounts of certain bases, will react very readily with an α-haloketone of the type specified below to give the desired vinyl phosphates or phosporothioates. Moreover, monoalkyl phosphonites, secondary phosphine oxides, and the corresponding thio-analogues, also react under such conditions, yielding vinyl phosphonates, phosphinates, and their thioanalogues, respectively. All these reactions proceed under mild reaction conditions and in one single step.

The use of dialkyl phosphites, as compared with the corresponding trialkyl derivatives, is of advantage because the former are more cheaply available, in general, as a result of simpler methods of preparation. Besides, reaction products having two dissimilar alkoxy groups bound to the phosphorus atom may easily be obtained with high yields when the appropriate dialkyl phosphite is used as the starting material.

Accordingly, the present invention is concerned with a process for the preparation of substituted vinyl esters of acids of phosphorus of the general formula

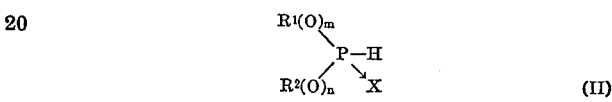

wherein X is an oxygen or a sulphur atom; $R^1$ and $R^2$ each individually represent an alkyl, cycloalkyl, aralkyl or aryl group, or $R^1$ and $R^2$ together form a bivalent aliphatic hydrocarbon radical, the sum of the number of carbon atoms of $R^1$ and $R^2$ amounting to from 2 to 12; $R^3$ is an aryl group optionally carrying one or more substituents; $R^4$ and $R^5$ each individually represent a hydrogen, a chlorine or a bromine atom, or an alkyl group having not more than 5 carbon atoms; and the subscripts $m$ and $n$ each individually represent either zero or one—in which process (A) an organic phosphorus compound of the general formula

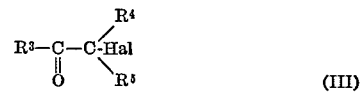

and/or a tautomer thereof, (B) an α-haloketone of the general formula $$R^3-\underset{\underset{O}{\|}}{C}-\underset{\underset{R^5}{}}{C}-Hal \quad \quad (III)$$

wherein Hal is a chlorine or a bromine atom, and the other symbols have the same meanings as above, and (C) a base are allowed to react with each other, the total amount of the base employed being at least 0.5 gramequivalent per mole of the α-haloketone (B).

Many of the compounds of the general Formula I which are obtainable according to the process of the invention are known to have marked biocidal properties and to be useful, in particular, as insecticides, acaricides, and nematocides. An enhanced biocidal effect is, moreover, frequently encountered when in the said formula the substituents $R^1$ and $R^2$ are different from each other.

In the Formulae I and II above, either or both of the substituents $R^1$ and $R^2$ may represent an alkyl group, for example, methyl, ethyl, isopropyl, n-butyl, isobutyl, or higher alkyl; a cycloalkyl group, such as cyclopentyl or cyclohexyl; an aralkyl group, e.g., benzyl; an aryl group, e.g. phenyl; or they may together form a bivalent hydrocarbon radical, such as ethylene, propylene, trimethylene, 1-methyl-, 2-methyl-, or 1,3-dimethyltrimethylene, tetramethylene, or a higher polymethylene; always provided that the total number of carbon atoms of $R^1$ and $R^2$ together ranges from 2 to 12. Optionally, $R^1$ and/or $R^2$ may contain halogen substituents, as in p-chlorophenyl. Favourable results are obtained, as a rule, when both $R^1$ and $R^2$ are alkyl groups, or when together they form a bivalent hydrocarbon radical. When $R^1$ and $R^2$ are the same, they preferably represent either methyl or ethyl groups. When, however, they are different from each other, then one is preferably a methyl group, while the other may represent a higher alkyl, cycloalkyl, aralkyl, or aryl group, an alkyl group having from 2 to 7 carbon atoms being particularly preferred.

The organic phosphorus compounds to be reacted with the α-haloketone are usually considered to have the Formula II above. The corresponding tautomeric forms

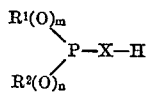

or mixtures therewith, are not excluded, however.

Depending on whether both, one, or none of the subscrpits *m* and *n* in Formula II above represent unit, the component (A) may be a diester of phosphorous or thiophosphorous acid $(R^1O)(R^2O)PH(X)$, a monoester of phosphonous or thiophosphonous acid $$(R^1O)R^2PH(X)$$

or a secondary phosphine oxide or sulphide, $R^1R^2PH(X)$, respectively, and/or a tautomer thereof.

As the component (A), the esters of phosphorous and thio phosphorous acid, and those of phosphonous and thiophosphonous acid, have proved to be particularly useful. Special preference is given, moreover, to the relevant esters wherein the total number of carbon atoms of $R^1$ and $R^2$ together ranges from two to eight. Thus, specially recommended esters of acids of phosphorus are the relevant diesters of phosphorous acid, especially the dialkyl phosphites, and in particular dimethyl, diethyl, and methyl n-butyl phosphite. The dialkyl phosphites having identical alkyl groups may conveniently be prepared by allowing 1 mole of phosphorus trichloride to react with about 3 moles of the relevant alcohol, preferably in an inert solvent, e.g. at a temperature between 10° and 30° C. In the case of dialkyl phosphites having dissimilar alkyl groups, such as methyl n-butyl phosphite, a mixture of about 2 moles of the lower and about 1 mole of the higher alcohol may be reacted with 1 mole of $PCl_3$. Hydrogen chloride (and the alkyl chloride) formed in these reactions may be removed by passing an inert gas, e.g. air, through the reaction mixture. Besides, it has proved advantageous to neutralize the remaining HCl with gaseous ammonia at the end of the reaction, and to employ the dialkyl phosphite thus obtained without any further purification in the reaction with the α-haloketone and the base, especially when the base is ammonia.

Of the other preferred groups of compounds which may be employed as component (A), according to the invention, the following deserve special mention: the diesters of thiophosphorous acid, particularly O,O-dimethyl, O,O-diethyl, and O,O-ethylene thiophosphite. The thiophosphites which may be used according to the invention, such as diethyl thiophosphite, may readily be prepared, for example, by reaction of a relevant dialkyl chlorophosphite $(R^1O)(R^2O)PCl$, with hydrogen sulphide in the presence of pyridine.

Excellent results have, moreover, been obtained with, as component (A), esters of phosphonous and of thiophosphonous acid, especially those wherein both $R^1$ and $R^2$ are methyl or ethyl groups, or wherein one of these substituents represents a methyl group and the other an ethyl group. Preferred examples are: ethyl ethylphosphonite, O-methyl and O-ethyl methylthiophosphonite, and O-methyl and O-ethyl ethylthiophosphonite. Excellent results have been obtained particularly in those cases where both $R^1$ and $R^2$ were ethyl groups. Examples of suitable secondary phosphine oxides are especially those in which the radicals $R^1$ and $R^2$ contain three or more carbon atoms each, such as di-n-hexyl, diphenyl, and bis(4 - chlorophenyl)phosphine oxide. The secondary phosphine sulphide may be, for example, dimethylphosphine sulphide.

The aryl group $R^3$ in the above Formulae I and III may be derived, for example, from benzene, biphenyl, naphthalene, or phenanthrene, the phenyl group being preferred. The aryl group suitably carries one or more substituents, such as fluorine, chlorine, bromine atoms, cyano groups and/or alkoxy groups, e.g. methoxy and ethoxy groups. Excellent results are achieved, for example, when $R^3$ is a halogenated—preferably chlorinated—phenyl group, in particular the 2,4- or 2,5-dichloro- or 2,4,5-trichlorophenyl group.

Either or both of the substituents $R^4$ and $R^5$ preferably represent a chlorine atom. If only one of these in chlorine, the other may be hydrogen, bromine, or an alkyl group with not more than 5 carbon atoms, a hydrogen atom being particularly preferred. The remaining halogen substituent bound to the same carbon as are $R^4$ and $R^5$ in Formula III, above, is suitably a chlorine atom. Examples of very useful α-haloketones are in particular 2,2,2',4'- and 2,2,2',5'-tetrachloro-, and 2,2,2',4',5'-pentachloroacetophenones. The latter ω-chlorinated acetophenones may be readily obtained, for example, by chlorinating the acetophenones in question in formic acid solution, in the presence of hydrogen chloride, as described in the British Pat. No. 1,062,369.

The base (C) which is to be reacted with the components (A) and (B) defined above, that is to say with at least one organic phosphorus compound of Formula II—and/or a tautomer thereof—and at least one α-haloketone of Formula III, may be selected from inorganic or organic bases, including those of a polymeric character. Examples of suitable bases are ammonia, the ammonia, alkali metal, and alkaline-earth metal hydroxides, carbonates and bicarbonates, such as $NH_4OH$, NaOH, KOH, BaO, CaO, $NaHCO_3$, $Na_2CO_3$, alkali metal alkoxides, such as the methoxides and ethoxides of sodium or potassium, alkylamines, such as diisobutylamine, cyclic amines, such as morpholine and piperidine, heteroaromatic bases, such as pyridine and the picolines, and basic ion exchange resins, e.g. of the type "Dowex I-X8" (an anion exchange resin having trimethyl benzyl ammonium acid group—in the chloride form—cross-linked with 8% of divinylbenzene). A mixture of two or more bases may, of course, also be used, if desired.

Particularly preferred bases are those which cannot give rise to the formation of water under the reaction conditions. For, water formed during the reaction, or otherwise present in the reaction mixture, apparently tends to decompose in part the compounds of phosphorus—e.g. by hydrolysis—with a consequent drop in yield of the vinyl ester product which it is desired to prepare. Thus, very suitable bases are, for example, ammonia ($NH_3$), and di- or trialkylamines having not more than 10 carbon atoms in the molecule, especially diisobutylamine. Outstanding results have been obtained, in particular, when using gaseous ammonia. The reaction with ammonia as the base may, for example, be represented schematically as follows:

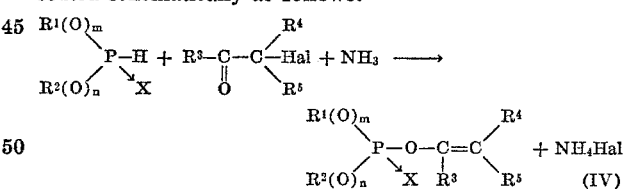

These reactions apparently proceed via an intermediate of the following structure:

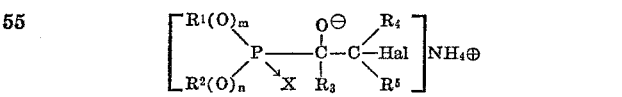

Other possible intermediate structures are not excluded, however.

The reaction according to the invention is preferably carried out in the absence, or at least substantial absence, of water. Relatively small amounts of water, say 5 mole percent of the component (A) may, however, be tolerated in many cases, although this usually leads to a drop in yield.

Substantially equivalent amounts of the components (A), (B) and (C) should preferably be allowed to react with each other. An excess of the base, e.g. of about 50% or more of the theoretical amount, has often proved beneficial, however. Conversely, it may be desirable in certain cases to employ a deficiency of the base although this will result in lower yields of the substituted vinyl ester product. The total amount of the base employed should at any rate not be less than 0.5 gramequivalent per mole of the α-haloketone(III), it being recommended to use at least 0.9 gramequivalent of the base per mole of the α-haloketone. The reaction may be carried out, for example, by adding one of the components (A), (B) or (C) to a mixture of the other two. Thus, the organic phosphorus compound (A) may be added to a mixture of the α-haloketone and a base, but, preferably, the base is contacted with a mixture of the other two reactants, a gradual addition of the base being especially recommended.

Generally, the process according to the invention is carried out in solution or suspension using one or more solvents or diluents which are substantially inert under the reaction conditions. Suitable solvents or diluents are, for example, alcohols, such as ethanol and isopropyl alcohol, aliphatic or aromatic hydrocarbons, e.g. petroleum ether, benzene, toluene or the xylenes.

It is especially recommended to apply a solvent and/or diluent that is immiscible with water, for in these cases the halide salt formed as a by-product, e.g. $NH_4Cl$, may very readily be removed after termination of the reaction by simply washing with water. The reaction product may then be recovered from the organic phase after separation of the phases, for example, by evaporation of the solvent. Excellent results have been obtained with aliphatic and aromatic hydrocarbons, such as petroleum ether or toluene, the latter being particularly preferred.

Suitable reaction temperatures generally range from $-30°$ C. to $+90°$ C at atmospheric pressure, temperatures in the range of $0°$ C. to $60°$ C. being preferred, particularly from $20°$ C. to $40°$ C. Higher or lower pressures may be employed, if desired.

The process of the invention may be operated batchwise or continuously.

The process of the invention has proved to be very useful for the preparation of various substituted vinyl esters of acids of phosphorus having biocidal, especially insecticidal, acaricidal and/or nematocidal properties, such as diethyl 2-chloro-1-(2,4-dichlorophenyl) vinyl phosphate, which can be obtained very conveniently by passing a current of gaseous ammonia into a mixture of 2,2,2',4'-tetrachloroacetophenone and diethyl phosphite dissolved in petroleum ether. In a similar way the corresponding methyl-n-butyl derivatives may be prepared using methyl n-butyl phosphite in place of diethyl phosphite. A further attractive example is the preparation of dimethyl 2-chloro-1(2,4,5-trichlorophenyl)vinyl phosphate by reaction of $NH_3$ with dimethyl phosphite and 2,2,2', 4',5'-pentachloroacetophenone. In an analogous manner, by employing in each case the appropriate components (A) and (B), various biocidal phosphorothioates, phosphonates, thiophosphonates, phosphinates and thiophosphinates have been prepared. Preferred examples are: O,O-dimethyl, O,O-diethyl and O,O-ethylene O-(2-chloro - 1 - (2,4-dichlorophenyl)vinyl)phosphorothioate, O,O-diethyl O - (2-chloro-1-(2,5-dichlorophenyl)vinyl) phosphorothioate, ethyl 2-chloro-1-(2,4-dichlorophenyl)-vinyl ethylphosphonate, O-methyl and O-ethyl O-(2-chloro-1-(2,4 - dichlorophenyl)vinyl)methylthiophosphonate and the corresponding ethylthiophosphonates, O-methyl and O-ethyl O-(2-chloro-1-(2,4,5-trichlorophenyl)vinyl) ethylthiophosphonate, 2-chloro-1-(2,4-dichlorophenyl)vinyl di-n-hexylphosphinate, the corresponding diphenyl- and bis(4-chlorophenyl)phosphinates, and O-(2-chloro - 1 - (2,4-dichlorophenyl)vinyl)dimethylthiophosphinate.

Those vinyl ester products of the general Formula I wherein the substituents $R^4$ and $R^5$ are different from each other, are usually obtained as mixtures of their geometric isomers, i.e. an isomer having the aryl group $R^3$ and the group $R^4$ in the cis-position, and an isomer having the said groups in the trans-position. In those cases where one of the substituents $R^4$ or $R^5$ is a hydrogen atom, the geometric isomer having both the hydrogen atom and the phosphorus-containing group in the cis-position will be designated as the α-isomer, and the isomer with the corresponding trans-configuration as the β-isomer. Depending on the application envisaged for the product in question, it may be desirable in certain cases to separate the mixture into its isomeric components. More often, however, this is not necessary, for example when the desired isomer predominates in the mixture, while the presence of the other isomer has no harmful effect on its activity, or when the biocidal properties of the two isomers complement each other, thus giving the product a wider range of application.

A particularly attractive method for the preparation of mixtures containing the geometric isomers of a vinyl phosphate in particular ratios is by allowing the appropirate α-haloketone to react with a mixture of the corresponding di- and trialkyl phosphites and the base. The required mixtures of di- and trialkyl phosphites may be prepared to advantage by reaction of $PCl_3$ with the relevant alcohol in the presence of a suitable base, preferably $NH_3$. Depending on the temperature adopted, a higher or lower dialkyl/trialkyl phosphite molar ratio results, whence a range of different ratios of α-/β-isomers may be produced by the subsequent reaction with the α-haloketone.

Thus, from ethanol and $PCl_3$ the molar ratios of diethyl/triethyl phosphite obtained were 48/52, 25/75 and 7/93 at temperatures of $35-40°$ C., $15-20°$ C. and $-10--5°$ C., respectively. The reaction of these mixtures with 2,2,2',4'-tetrachloroacetophenone and $NH_3$, according to the process of the invention, yielded the diethyl 2-chloro-1-(2,4-dichlorophenyl) vinyl phosphate in molar ratios of the α-/β-isomer of 19/81, 9/91 and 6/94, respectively.

Many of the products obtainable according to the process of the invention have not previously been prepared. Thus, the following are considered to be novel compounds: Those compounds of the Formula I above wherein the substituents $R^1$ and $R^2$ together form a bivalent hydrocarbon radical, X is sulphur, and $m=n=1$, the other symbols having the same meanings as indicated above, particularly O,O-ethylene O-(2-chloro-1-(2,4-dichlorophenyl)vinyl)phosphorothioate; phosphonates of Formula I above (X is oxygen, $m=1$, $n=$zero) wherein $R^3$ is a phenyl group carrying two or three chlorine substituents, in particular ethyl 2-chloro-1-(2,4-dichlorophenyl)vinyl ethylphosphonate; furthermore, O-methyl O-(2-chloro-1-(2,4 - dichlorophenyl)vinyl)ethylthiophosphonate; thiophosphonates of Formula I above (X=S, $m=1$, $n=$zero) wherein $R^3$ is a phenyl group carrying at least three chlorine and/or bromine substituents, especially O-methyl and O-ethyl O-(2-chloro-1-(2,4,5-trichlorophenyl)vinyl)ethylthiophosphonate; and phosphinates and thiophosphinates of Formula I above (X=O or S, $m=n=$zero) wherein $R^3$ is a phenyl group carrying two or three chlorine substituents, especially 2-chloro-1-(2,4-dichlorophenyl)-vinyl di-n-hexylphosphinate, and the corresponding diphenylphosphinate and bis(4-chlorophenyl)phosphinate.

According to a special aspect of the invention, the products obtained by the new process may be employed to advantage as active ingredients of biocidal, especially insecticidal, acaricidal, or nematocidal preparations, preferably together with a solid or liquid carrier and/or a surface-active agent.

EXAMPLE I

Preparation of diethyl 2-chloro-1-(2,4-dichlorophenyl) vinyl phosphate

Reactants: the diethyl phosphite which had been prepared by reaction of ethanol with $PCl_3$ according to generally known procedures had a purity of 90% after distillation at reduced pressure (B.P. $81°$ C. at 15 mm. Hg). The 2,2,2',4'-tetrachloroacetophenone had been obtained from m-dichlorobenzene by acetylation with acetyl chloride, followed by chlorination of the dichloroacetophenone(s) in formic acid solution in the presence of hydrogen chloride, according to the British Pat. No. 1,062,369.

It contained as an impurity about 3% by weight of 2,2',6'-trichloroacetophenone.

A three-necked ½-litre round-bottomed flask provided with a reflux condenser, a mechanical stirrer, a gas-inlet tube, a dropping funnel and a thermometer, was charged with a solution of 27.1 g. (0.105 mole) of 2,2,2',4'-tetrachloroacetophenone in 80 ml. of petroleum ether (B.P. 60–80° C.) and 15.9 g. (0.105 mole) of diethyl phosphite.

A stream of dry ammonia was then passed into the solution for one hour with stirring, the temperature being kept at 20° C. by cooling. A total of 2.5 g. (0.15 mole) of $NH_3$ was thus introduced.

The heterogeneous reaction mixture obtained was then transferred to a separation funnel and washed with 100 ml. of water to dissolve and remove the $NH_4Cl$ formed in the reaction. The washing was repeated twice with 50-ml. portions of water each. The organic phase was finally sepaarted, dried on anhydrous $Na_2SO_4$, and the solvent removed at about 12 mm. Hg and a bath temperature up to 50° C., using a rotary evaporator.

The crude reaction product thus obtained weighed 37 g., which corresponds to a virtually quantitative yield based on the tetrachloroacetophenone, as was shown by chromatographic purification of a sample in toluene solution using a column of silicagel (100–200 mesh). Elution with toluene removed the impurity (3.3% by weight), whereupon the desired product (96.7% by weight) was obtained in a pure state by elution with ethyl acetate. It consisted of 70% of the $\beta$-isomer and 30% of the $\alpha$-isomer.

Purification of the crude product may usually be omitted, however, when the product is to be used as an insecticide.

EXAMPLE II

Preparation of diethyl 2-chloro-1-(2,4-dichlorophenyl) vinyl phosphate

In this experiment both the preparation of diethyl phosphite and its subsequent reaction with the tetrachloroacetophenone were carried out in the same reaction vessel, the diethyl phosphite being used without previous distillation.

To 69 g. (1.5 mole) of absolute ethanol diluted with 70 ml. of petroleum ether (boiling range 60°–80° C.) a solution of 69 g. (0.5 mole) of $PCl_3$ in 70 ml. of petroleum ether was gradually added in one hour with stirring and cooling, the temperature of the reaction mixture being kept between 15° and 25° C. When about half the quantity of $PCl_3$ had been added, evolution of HCl and ethyl chloride started. Subsequently the temperature was raised to 35° C. and dry air was bubbled through the mixture for 90 minutes at a rate of 5–10 litres per hour. In order to neutralize the remaining HCl (0.3 mole) gaseous ammonia was introduced into the reaction mixture for 30 minutes after cooling to room temperature.

Without any further purification 103.2 g. (0.4 mole) of 2,2,2',4'-tetrachloroacetophenone was added, and gaseous ammonia was then introduced with cooling and the resulting mixture worked up as described in Example I, above. The reaction product thus obtained weighed 142 g. The yield was 99% of theory, based on the tetrachloroacetophenone originally present. The ratio of $\beta$-/$\alpha$-isomer was 70/30.

EXAMPLE III

Preparation of dimethyl 2-chloro-1-(2,4,5-trichlorophenyl) vinyl phosphate

Reactants: the 2,2,2',4',5'-pentachloroacetophenone used in this experiment was a crude product with a purity of 73.9% by weight, which had been obtained by acetylation of 1,2,4-trichlorobenzene with acetyl chloride and subsequent chlorination of the crude reaction mixture in formic acid solution in the presence of hydrogen chloride, according to the U.K. patent specification No. 1,062,369. The dimethyl phosphite was a commercial product.

A mixture of 16.6 g. (0.042 mole) of 2,2,2',4',5'-pentachloroacetophenone and 6.22 g. (0.056 mole) of dimethyl phosphite dissolved in 50 ml. of toluene was reacted with gaseous ammonia in a manner analogous to that described in Example I.

The reaction mixture was then taken up in water and extracted twice with ether. The combined ether extracts were washed with water, dried, and the solvent removed by evaporation. The residue (18.44 g.) was then dissolved in 100 ml. of ethanol and the solution refluxed for 30 minutes in the presence of active carbon. After filtration and removal of the solvent under reduced pressure 17.26 g. of a yellowish brown, crystalline product was obtained which proved to contain 14.35 g. of the desired vinyl phosphate derivative (isolation by chromatography). The latter consisted of 75% of the $\beta$-isomer and 25% of the $\alpha$-isomer.

The conversion of the 2,2,2',4',5'-pentachloroacetophenone was 96 mole percent with a selectivity of 97.5 mole percent.

EXAMPLE IV

Preparation of methyl n-butyl 2-chloro-1-(2,4-dichlorophenyl) vinyl phosphate

In a manner analogous to that described in Example I, a mixture of 15.2 g. (0.1 mole) of methyl n-butyl phosphite and 23.22 g. (0.09 mole) of 2,2,2',4'-tetrachloroacetophenone dissolved in 150 ml. of petroleum ether (boiling range 60–80° C.) was reacted with gaseous ammonia. The starting temperature was 0° C., and the ammonia was introduced for one hour at such a rate that the temperature did not rise above 20° C.

After working up, a crude reaction product was obtained weighing 33.5 g. The conversion of the tetrachloroacetophenone amounted to 98 mole percent with a selectivity of 93 mole percent. The ratio of $\beta$-isomer/$\alpha$-isomer was 70/30.

EXAMPLE V

Preparation of diethyl 2-chloro-1-(2,4-dichlorophenyl) vinyl phosphate

In this experiment aqueous ammonia (a 20% by weight solution calculated on $NH_3$) was used as the base. For the rest, the reaction was carried out in a manner analogous to that described in Example I.

From the separatory funnel 35 ml. of aqueous ammonia (corresponding to 0.350 mole $NH_3$) was added at 20° C. in 30 minutes with stirring and cooling to a mixture of 42.0 (0.275 mole) of diethyl phosphite and 64.5 g. (0.25 mole) of 2,2,2',4'-tetrachloroacetophenone dissolved in 150 ml. of toluene. Stirring was then continued at that temperature for another three hours.

After working up, 86.7 g. of a crude reaction product was obtained which proved to contain 0.184 mole of the desired vinyl phosphate derivative, in addition to 0.063 mole of unconverted 2,2,2',4' - tetrachloroacetophenone (GLC analysis). Hence, the conversion of the tetrachloroacetophenone was 75 mole percent with a selectivity of 99 mole percent which corresponds to a yield of 74% based on the tetrachloroacetophenone originally present. The ratio of $\beta$-isomer/$\alpha$-isomer was 70/30.

EXAMPLE VI

Preparation of diethyl 2-chloro-1-(2,4-dichlorophenyl) vinyl phosphate

In this experiment the base used was diisobutylamine. For the rest, the reaction was carried out as described in Example V.

Thus, a mixture of 25.8 g. (0.1 mole) of 2,2,2',4'-tetrachloroacetophenone and 16.6 g. (0.12 mole) of diethyl phosphite dissolved in 100 ml. of toluene, was allowed to react with 12.95 g. (0.1 mole) of diisobutylamine with stirring but without cooling. The temperature rose to 40° C.

The reaction mixture was worked up after standing for three days, giving 34.7 g. of a crude product. The yield, based on the tetrachloroacetophenone was 85% of theory. The ratio of the β-isomer/α-isomer was 70/30.

Diisobutylamine may readily be recovered from its hydrochloride present in the water washings by heating with aqueous NaOH.

EXAMPLE VII

Preparation of diethyl 2-chloro-(2,4-dichlorophenyl)vinyl phosphate

In these experiments various mixtures of diethyl phosphite and triethyl phosphite were used instead of diethyl phosphite alone.

A solution of 27.4 g. (0.200 mole) of $PCl_3$ in 200 ml. of toluene was gradually run into a stirred solution of 30 g. (0.650 mole) of ethanol in 100 ml. of toluene, to which 0.5 g. of pyridine (about 1 mole percent based on the ethanol) and a few milligrams of methyl orange had been added. Simultaneously a stream of gaseous $NH_3$ was passed into the mixture at such a rate that the solution remained neutral towards the indicator, the temperature being kept to 15–20° C.

To the crude reaction mixture, which contained diethyl and triethyl phosphites (yield 85 mole percent on $PCl_3$ intake) in a molar ratio of 25/75, 43.8 g. (0.170 mole) of 2,2,2',4'-tetrachloroacetophenone was then added, and gaseous ammonia was introduced with cooling and stirring for one hour, while the temperature was kept at about 20° C. Subsequently, the mixture was heated at 60–70° C. for two hours with continued stirring. After working up, the desired vinyl phosphate was obtained in a yield of 96 mole percent, based on the tetrachloroacetophenone.

As was shown by GLC and NMR, the product obtained consisted of 91% of the β-isomer and 9% of the α-isomer. These isomers were obtained in β-/α-ratios of 81/19 and 94/6 when the diethyl and triethyl phosphites used were present in molar ratios of 48/52 and 7/93, respectively.

EXAMPLE VIII

Preparation of O,O-diethyl O-(2-chloro-1-(2,4-dichlorophenyl)vinyl)-phosphorothioate Reactants: The diethyl thiophospite used had been prepared by reaction of diethyl chlorophosphite, $(ETO)_2PCl$, with hydrogen sulphide, in the presence of pyridine. It had a purity of >98%. The 2,2,2',4' - tetrachloroacetophenone had been obtained as indicated in Example I.

In a three-necked ½-litre round-bottomed flask provided with a reflux condenser, a mechanical stirrer, a gas-inlet tube, a dropping funnel and a thermometer, 18.5 g. (0.12 mole) of diethyl thiophosphite and 25.8 g. (0.1 mole) of 2,2,2',4'-tetrachloroacetophenone were dissolved in 100 ml. of ethanol at 10° C. With stirring, 0.15 mole of gaseous ammonia was introduced at such a rate that the temperature remained at 5–10° C. Subsequently, the mixture was stirred for two hours at the same temperature, whereupon the solvent was evaporated. The heterogeneous mixture thus obtained was then taken up in toluene and washed three times with 50 ml. portions of water to remove the $NH_4Cl$ formed in the reaction. The organic phase was finally separated, dried on anhydrous $Na_2SO_4$, and the solvent evaporated at about 12 mm. Hg.

The yield of the desired phosphorothioate amounted to 98% based on the tetrachloroacetophenone used. The α/β-isomer ratio was 50/50.

EXAMPLE IX

Preparation of O,O-diethyl O-(2-chloro-1-(2,5-dichlorophenyl)vinyl)phosphorothioate In a manner analogous to that described in Example VIII, 30.8 g. (0.2 mole) of diethyl thiophosphite and 50.8 g. (0.197 mole) of 2,2,2',5'-tetrachloroacetophenone were dissolved in a mixture of 100 ml. of ethanol and 100 ml. of benzene at 10° C., whereupon with stirring 0.3 mole of $NH_3$ were introduced at 15–20° C. over a period of two hours. After working up in the usual way, the desired product was obtained in 99% yield; the α-/β-isomer ratio was 48/52.

EXAMPLE X

Preparation of O,O-dimethyl O-(2-chloro-1-(2,4-dichlorophenyl)vinyl)phosphorothioate In a manner analogous to that described in Example VIII, 16.1 g. (0.13 mole) of ethylene thiophosphite 25.8 g. (0.1 mole) of 2,2,2',4'-tetrachloroacetophenone in 100 ml. of ethanol were allowed to react with $NH_3$. The desired phosphorothioate was obtained in 97% yield; the α-/β-isomer ratio was 43/57.

EXAMPLE XI

Preparation of O,O-ethylene O-(2-chloro-1-(2,4-dichlorophenyl)vinyl)phosphorothioate In a manner analogous to that described in Example VIII, 16.1 g. (0.13 mole) of ethylene thiophosphite was mixed with 31.0 g. (0.12 mole) of 2,2,2',4'-tetrachloroacetophenone in 100 ml. of ethanol. With stirring, 0.15 mole of gaseous $NH_3$ was then introduced at 10° C. over a period of two hours. After working up in the usual way, the yield of the desired product amounted to 62% based on the 2,2,2',4'-tetrachloroacetophenone used; the α-/β-isomer ratio was 40/60. From the mixture obtained the β-isomer could be isolated in a pure state by crystallization from ethanol. It melted at 110–111° C.

The product was identified by means of GLC, NMR, and mass-spectrometric and elementary analysis.

EXAMPLE XII

Preparation of ethyl 2-chloro-1-(2,4-dichlorophenyl)vinyl ethylphosphonate

In a manner analogous to that described in Example VIII, 25.4 g. (0.208 mole) of ethyl ethylphosphonite was allowed to react with 51.6 g. (0.20 mole) of 2,2,2',4'-tetrachloroacetophenone in 200 ml. toluene as a solvent, by introduction of a small excess of gaseous $NH_3$ at room temperature in two hours. The temperature was then raised to 50–60° C. and heating was continued for another two hours. After the usual working up, the desired phosphonate was obtained in a yield of 64% based on the tetrachloroacetophenone. It had a purity of 80% and an α-/β-isomer ratio of 14/86.

The product was identified by elementary analysis, GLC, NMR and mass-spectrometric analysis.

EXAMPLE XIII

Preparation of O-methyl O-(2-chloro-1-(2,4-dichlorophenyl)vinyl)ethylthiophosphonate 6.2 g. (0.05 mole) of methyl ethylthiophosphonite and 12.0 g. (0.0465 mole) of 2,2,2',4'-tetrachloroacetophenone were dissolved in 50 ml. dry ethanol and ammonia bubbled in for 45 minutes at a rate of 0.1 mole/litre per hour, the temperature eing kept between 20 and 25° C. by cooling. The suspension was then stirred for four hours at room temperature, after which GLC showed only a small amount of starting material left. 150 ml. of ether were added and the ethereal solution washed with water (three times), dried and the solvent removed. The bottom product thus obtained weighed 15.0 g. The yield of the desired thiophosphonate amounted to 93%.

EXAMPLE XIV

Preparation of O-methyl O-(2-chloro-1-(2,4,5-trichlorophenyl)vinyl)ethylthiophosphonate In a manner analogous to that described in Example XIII, using the appropriate reactants, a yield of 97% of crude product was obtained. The product which solidified on standing was recrystallized from methanol. Yield 51%.

EXAMPLE XV

Preparation of O-ethyl O-(2-chloro-1-(2,4,5-trichlorophenyl)vinyl)ethylthiophosphonate In a manner analogous to that described in Example XIII, using the appropriate reactants, a yield of 90% of crude product was obtained. The product which solidified on standing was recrystallized from ethanol. Yield 59%.

EXAMPLE XVI

Preparation of 2-chloro-1-(2,4-dichlorophenyl)vinyl di-n-hexylphosphinate 21.8 g. (0.1 mole) of di-n-hexylphosphine oxide was mixed with 25.8 g. (0.1 mole) of 2,2,2',4'-tetrachloroacetophenone in 250 ml. of toluene at room temperature, whereupon gaseous ammonia was introduced in small excess for 90 minutes. After the usual working up, the desired phosphinate was isolated by chromatography using a column of silicagel (100–200 mesh). The yield was 82%.

The structure of the product was confirmed by elementary analysis, NMR and mass-spectrometric analysis.

EXAMPLE XVII

Preparation of 2-chloro-1-(2,4-dichlorophenyl)vinyl diphenylphosphinate

In a manner analogous to that described in Example XVI, 20.2 g. (0.1 mole) of diphenylphosphine oxide, 25.8 g. (0.1 mole) of 2,2,2',4'-tetrachloroacetophenone and $NH_3$ were allowed to react with each other. The desired product was obtained in 92% yield. It melted at 114° C. after crystallization from an acetone/hexane mixture. The structure was confirmed by elementary analysis, NMR and mass-spectrometric analysis.

EXAMPLE XVIII

Preparation of 2-chloro-1-(2,4-dichlorophenyl)vinyl bis(4-chlorophenyl)phosphinate The product was obtained in a manner analogous to that described in Example XVII by reacting 27.1 g. (0.1 mole) of bis(4-chlorophenyl)phosphine oxide, 25.8 g. (0.1 mole) of 2,2,2',4'-tetrachloroacetophenone and $NH_3$. The yield was 95%. The desired product melted at 60–61° C. after crystallization from hexane. Its structure was confirmed by elementary analysis, NMR and mass-spectrometric analysis.

What is claimed is:

1. A process for the preparation of substituted vinyl esters of acids of phosphorus of the general formula

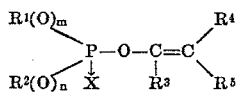

wherein X is an oxygen or a sulphur atom; $R^1$ and $R^2$ each individually represent an alkyl, cycloalkyl, aralkyl or aryl group, or $R^1$ and $R^2$ together form an alkylene chain optionally substituted on the chain with one or more alkyl groups, the sum of the number of carbon atoms of $R^1$ and $R^2$ amounting to from 2 to 12; $R^3$ is phenyl containing from 1 to 3 chlorine atoms; $R^4$ and $R^5$ each individually represent a hydrogen, a chlorine or a bromine atom, or an alkyl group having not more than 5 carbon atoms; and the subscripts $m$ and $n$ each individually represent either zero or one—which comprises reacting with each other (A) an organic phosphorus compound of the general formula

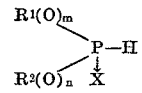

and/or a tautomer thereof (B) an α-haloketone of the general formula

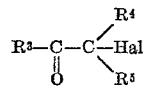

wherein Hal is a chlorine or a bromine atom, and the other symbols have the same meanings as above, and (C) a base, the total amount of the base employed being at least 0.5 gramequivalents per mole of the α-haloketone (B); said reaction being carried out at a temperature within the range of from about 0° C. to about 60° C.

2. The process according to claim 1 wherein the base is selected from the group comprising ammonia and di- or trialkylamines having not more than 10 carbon atoms.

3. The process according to claim 2 wherein the reaction is carried out in a solvent that is immiscible with water.

4. The process according to claim 2 wherein $R^1$ and $R^2$ are alkyl or together form an alkylene chain.

5. The process according to claim 2 wherein $R^3$ is 2,4-dichlorophenyl, 2,5-dichlorophenyl or 2,4,5-trichlorophenyl, one of $R^4$ and $R^5$ is chlorine and the other is chlorine or hydrogen.

6. The process according to claim 2 wherein $R^1$ and $R^2$ are ethyl, $R^3$ is 2,4-dichlorophenyl, $R^4$ is hydrogen and $R^5$ is chlorine and the base is selected from the group consisting of gaseous ammonia and diisobutylamine.

7. The process according to claim 2 wherein $R^1$ and $R^2$ are methyl, $R^3$ is 2,4,5-trichlorophenyl, $R^4$ is hydrogen and $R^5$ is chlorine and the base is selected from the group consisting of gaseous ammonia and diisobutylamine.

References Cited

FOREIGN PATENTS 1,024,945  8/1958  Germany _____ 260—970

JOSEPH REBOLD, Primary Examiner

A. H. SUTTO, Assistant Examiner

U.S. Cl. X.R.

260—936, 937, 940, 951, 955, 957, 969; 424—209, 210, 217, 219